(12) United States Patent
Ayazi et al.

(10) Patent No.: US 7,360,423 B2
(45) Date of Patent: Apr. 22, 2008

(54) RESONATING STAR GYROSCOPE

(75) Inventors: Farrokh Ayazi, Atlanta, GA (US); Mohammad Faisal Zaman, Atlanta, GA (US); Ajit Sharma, Bangalore (IN); Babak Vakili Amini, Marietta, GA (US)

(73) Assignee: Georgia Tech Research Corp., Atlanta, GA (US)

( * ) Notice: Subject to any disclaimer, the term of this patent is extended or adjusted under 35 U.S.C. 154(b) by 168 days.

(21) Appl. No.: 11/341,721

(22) Filed: Jan. 27, 2006

(65) Prior Publication Data

US 2006/0225504 A1    Oct. 12, 2006

Related U.S. Application Data

(60) Provisional application No. 60/710,710, filed on Aug. 23, 2005.

(51) Int. Cl.
*G01P 9/04*    (2006.01)
(52) U.S. Cl. .................. 73/504.12; 73/504.13
(58) Field of Classification Search ............. 73/504.12, 73/504.13
See application file for complete search history.

(56) References Cited

U.S. PATENT DOCUMENTS 4,674,331 A *  6/1987  Watson ............... 73/504.16
6,889,550 B2 *  5/2005  Beitia ................ 73/504.12

FOREIGN PATENT DOCUMENTS

EP          773429      *   5/1997

OTHER PUBLICATIONS

M.F. Zaman, A. Sharma, B. Amini, F. Ayazi, in "Towards Inertial Grade Microgyros: A High-Q In-Plane SOI Turning Fork Device", Digest, Solid-State Sensors and Actuators Workshop, Hilton Head, SC, Jun. 2004, pp. 384-385.
F. Ayazi and K. Najafi, in "A HARPSS Polysilicon Vibrating Ring Gyroscope", IEEE/ASME JMEMS, Jun. 2001, pp. 169-179.
F. Ayazi and K. Najafi, entitled "A High-Aspect Ratio Combined Poly and Single-Crystal Silicon (HARPSS) MEMS Technology", IEEE/ASME JMEMS, Sep. 2000, pp. 288-294.
R. Abdolvand, G.K. Ho, A. Erbil, and F. Ayazi, entitled "Thermoelastic Damping in Trench-Refilled Polysilicon Resonators," Proc. Transducers 2003, pp. 324-327.

* cited by examiner

*Primary Examiner*—John E Chapman
(74) *Attorney, Agent, or Firm*—Kenneth W. Float

(57) ABSTRACT

Disclosed are resonant vibratory gyroscopes and fabrication methods relating thereto. The angular motion sensor comprises a resonating star gyroscope which comprises a vibratory solid or shell-type structure for rate sensing or measuring angle of rotation. The structure formed as a merged superposition of two square entities, yields in-plane degenerate flexural modes that are used to sense rotation around the axis perpendicular to the substrate. The resonating star gyroscope may be implemented using the primary flexural degenerate modes. Such an implementation has been successfully demonstrated by the authors using trench-refilled polysilicon and epitaxial polysilicon as the structural material. It is also possible to use a solid star-shaped resonator (with or without perforations) for the gyroscope. The authors also suggest the operation of the resonating star gyroscope employing the higher-order flexural modes. In this particular implementation the authors utilized a (100) single crystalline structural material.

22 Claims, 14 Drawing Sheets

US 7,360,423 B2

RESONATING STAR GYROSCOPE

CROSS-REFERENCE TO RELATED APPLICATIONS

This application claims the benefit of U.S. Provisional Application No. 60/710,710, filed Aug. 23, 2005.

BACKGROUND

The present invention relates generally to resonating star gyroscopes and fabrication methods relating thereto.

Low power vibratory microgyroscopes are needed in numerous consumer applications due to their small size, low power and ease of fabrication. Vibratory gyroscopes, which are based on transfer of energy between two vibration modes of a structure, can operate in either matched-mode or split-mode condition.

Under matched-mode condition, the sense mode is designed to have the same (or nearly the same) resonant frequency as the drive mode. Hence, the rotation-induced Coriolis signal is amplified by the Q of the sense mode (which can be high in vacuum).

In split-mode condition, the drive and sense modes are separated in resonant frequency. Due to Q amplification, gyroscopes operated under matched-mode configuration offer higher sensitivity and better resolution.

Resonant matched devices are themselves broadly classified into two types depending upon the nature of their operating modes. Type I devices rely on non-degenerate vibration modes for driving and sensing. The tuning fork gyroscope is an example of a type I gyroscope. As reported by M. F. Zaman, A. Sharma, B. Amini, F. Ayazi, in "Towards Inertial Grade Microgyros: A High-Q In-Plane SOI Tuning Fork Device", *Digest, Solid-State Sensors and Actuators Workshop*, Hilton Head, S.C., June 2004, pp. 384-385, it is often difficult to achieve and maintain mode matching in these devices. Type II devices on the other hand function with degenerate vibration modes and are invariably easier to match and operate under matched condition. A shell type gyroscope such as the vibrating ring gyroscope disclosed by F. Ayazi and K. Najafi, in "A HARPSS Polysilicon Vibrating Ring Gyroscope", IEEE/ASME JMEMS, June 2001, pp. 169-179, is an example of a type II gyroscope.

The resonating star gyroscope represents a class of type-II vibratory gyroscope that has distinct performance advantages over the existing counterparts.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
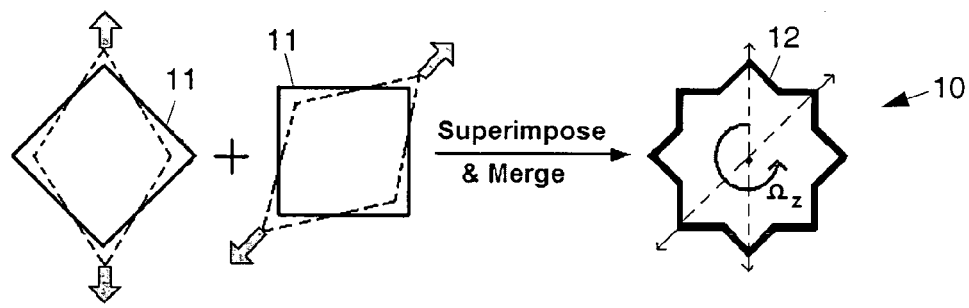
FIG. 1 shows a conceptual illustration of an exemplary resonating star gyroscope.
Figure 2:
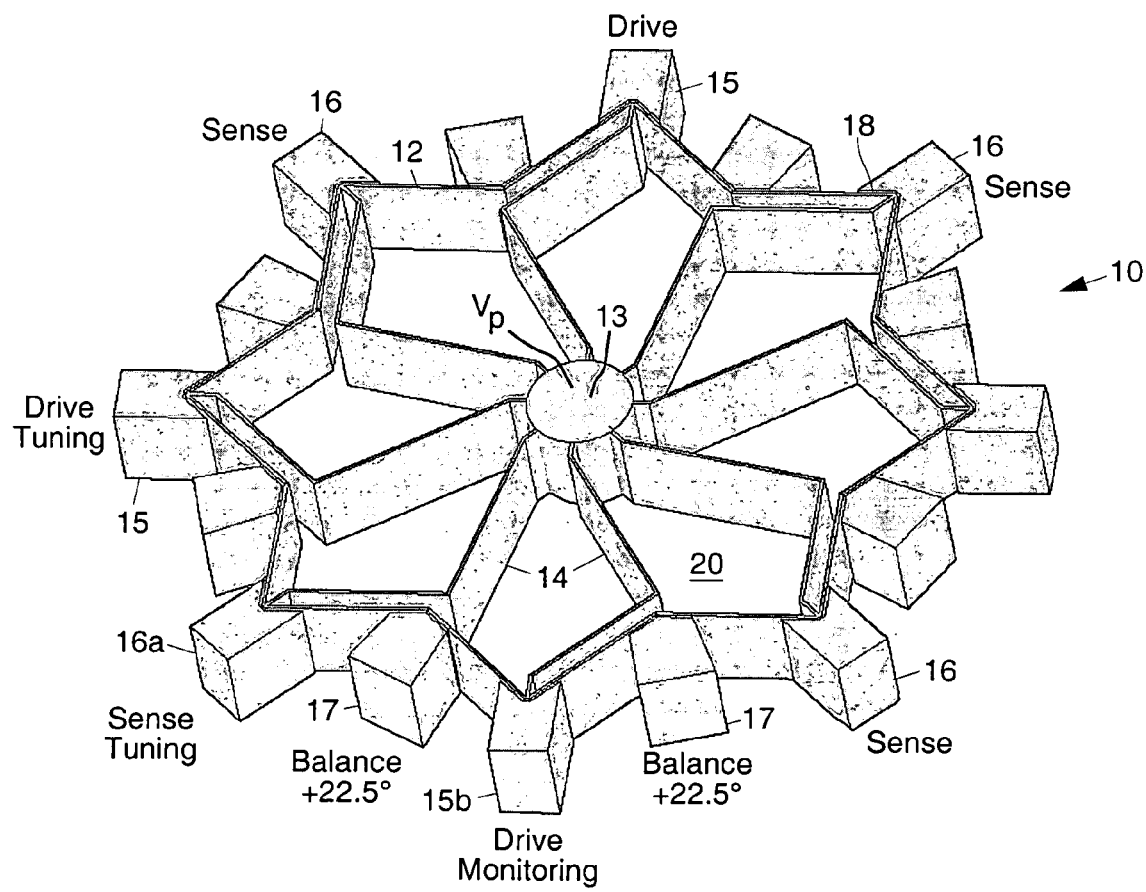
FIG. 2 is a schematic diagram of an exemplary resonating star gyroscope.

Disclosed herein are type II resonant matched vibratory gyroscopes 10 and fabrication methods 30 relating thereto. The type II resonant matched vibratory gyroscopes 10 are referred to as resonating star gyroscopes 10. Referring to the drawing figures, FIG. 1 shows a conceptual illustration of an exemplary resonating star gyroscope 10. A schematic diagram of an exemplary resonating star gyroscope 10 is illustrated in FIG. 2.

As is illustrated in FIG. 1, the resonating star gyroscope 10 may be visualized as a merged superposition of two substantially identical square entities 11 that are spatially 45° apart. This provides for pairs of degenerate flexural vibratory modes in the resulting eight-fold star-shaped member 12 or shell 12 (FIG. 2), which is anchored to a substrate 13 comprising a central post 13 or anchor 13, through flexural springs 14. It is to be understood, however, that the central post 13 or anchor 13 may be located outside of the shell 12. In the current design, eight optimally designed springs are used to maintain degeneracy of the resonant modes. Furthermore the star shell or member may also be suspended at alternate points on the periphery using flexural springs or support posts connected at one or several section (s) of the substrate. The physical dimensions of these support structures may/may not be governed by the dimensions of the star-structural material, i.e. the thickness of the support flexures may be less than the actual star shell or member. Rotation-induced Coriolis acceleration causes energy to be transferred between two flexural modes of any degenerate resonant pair. The nodes of each mode are located at the anti-nodes of its degenerate counterpart.

The star gyroscope 10 is a fully symmetric and balanced structure that offers differential sensing capability. As is shown in FIG. 2, the shell 12 is surrounded by capacitive drive, sense and tuning (balancing) electrodes 15, 16, 17. The electrodes 15, 16, 17 may be separated from the shell 12 by capacitive gaps 18, although this is not required in all devices. Electrode placement schemes enable frequency matching of both primary and higher-order flexural modes.

It is to be understood, however, that the electrodes need not be capacitively coupled to the shell 12, and may be physically connected in certain embodiments. Electrodes in the form of piezoelectric/piezoresistive material may be deposited along the nodal-points of the star-shaped periphery. Such materials may also act as an anchoring agent to the underlying device substrate. Structural features of the exemplary resonating star gyroscope 10 shown in FIG. 2 are that the external star-shaped shell 12 is suspended using flexural springs 14 supported at a central anchor 13, eight flexural springs 14 are used to ensure degenerate resonant flexural mode pairs, the frequency of the structure is dependent on dimensions of the flexural springs 14, the width of the flexural springs 14 also govern mechanical quality factors of the resonant mode, the central anchor 13 also effects the overall resonant frequency and mechanical quality factor of the flexural modes, the electrodes 15, 16, 17 (in this case) are distributed around the periphery of the star-shell 12, the electrodes are electrically isolated from an underlying substrate 20 or structural member 20, and the resonating star shell 12 is kept at the same potential of the substrate 20.

Figure 2A:
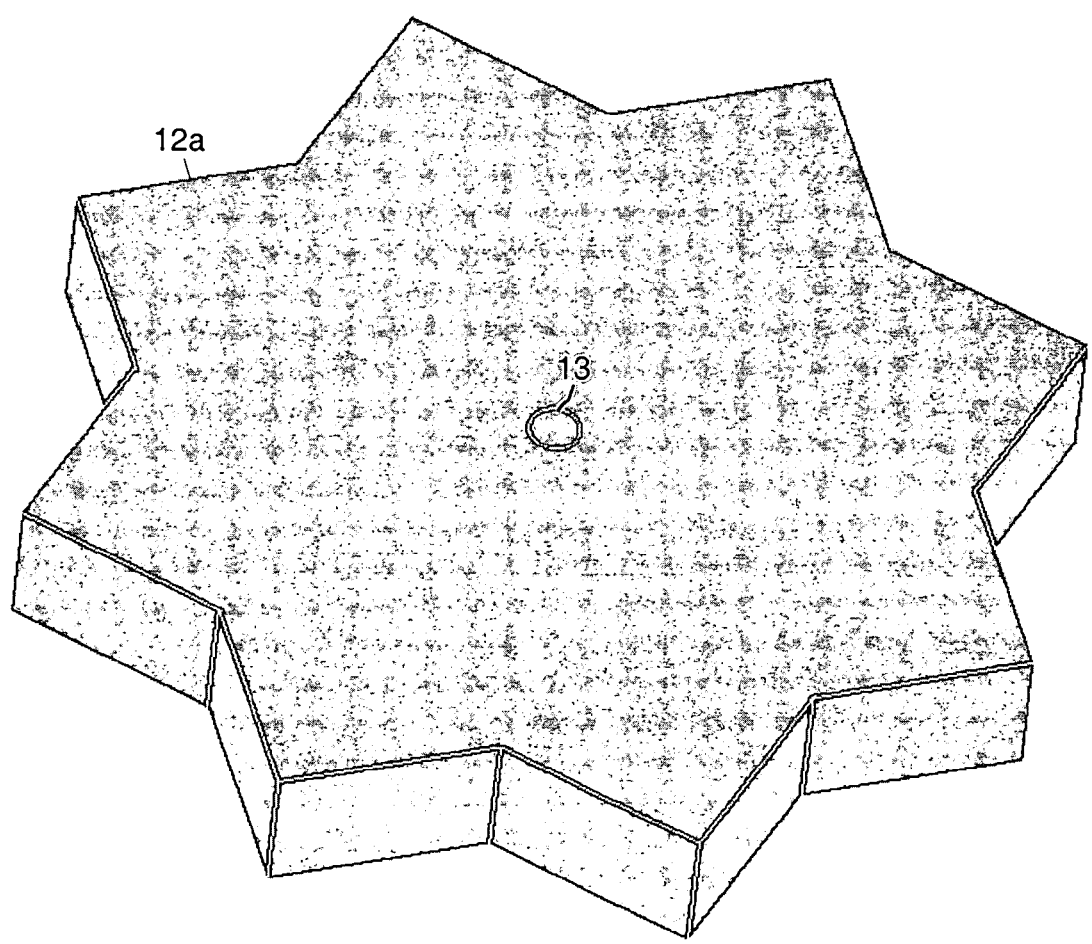
FIG. 2a illustrates a portion of an exemplary gyroscope comprising a solid star-shaped member 12.

However, it is to be understood that the resonating star gyroscope 10 need not necessarily embody a shell 12 supported by multiple flexural springs 14 coupled to the support member 13 or central post 13. The star structure may be fabricated using a solid star-shaped member 12a that may or may not employ the flexural springs 14. A portion of an exemplary gyroscope 10 comprising a solid star-shaped member 12 is illustrated in FIG. 2a. An exemplary solid resonating star gyroscope 10 has the solid star-shaped member 12a supported at its center of mass or coupled to and supported by the support member 13 using a plurality of flexural springs 14. The solid star-shaped member 12a may have perforations in formed its structure during fabrication to facilitate its release.

Figure 3:
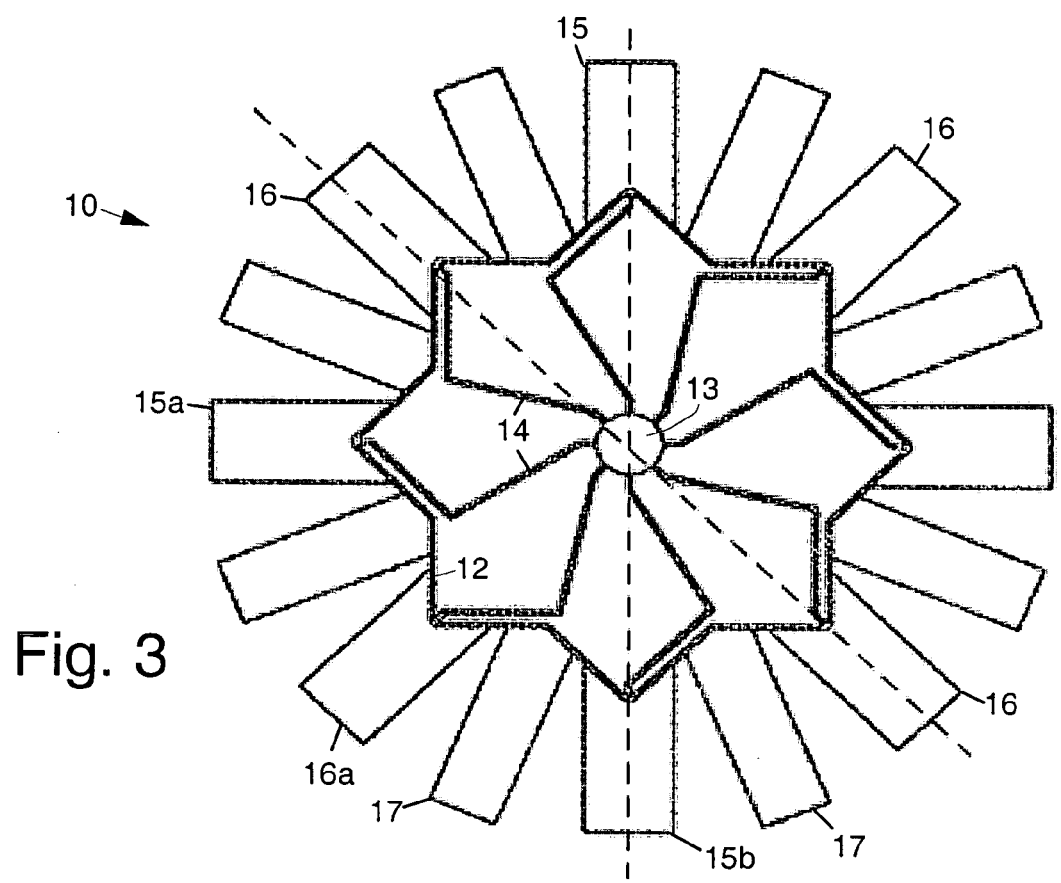
FIG. 3 illustrates an exemplary electrode configuration for the resonating star gyroscope.

FIG. 3 illustrates an exemplary electrode configuration for the resonating star gyroscope 10 shown in FIG. 2. The electrodes include a drive electrode 15 disposed at 0°, a sense electrode 16 disposed at −45°, a sense electrode 16 disposed at 45°, a sense electrode 16 disposed at 135°, a drive tuning electrode 15a disposed at −90°, a sense tuning electrode 16a disposed at −135°, a drive monitoring electrode 15b disposed at 180°, and two tuning (balancing) electrodes 17 disposed at 157.5° and −157.5°, respectively.

The star-shaped shell 12 is electrostatically driven into resonance at the primary flexural mode. When the gyroscope 10 is subjected to rotation, Coriolis force causes energy to be transferred to the secondary degenerate mode located 45° away. This consequential motion is sensed capacitively at the sense electrodes 16.

With regard to the electrode configuration shown in FIG. 3, for bare-minimal operation, two electrodes are required—the drive electrode 15 (0°) and the sense electrode 16 (45°). For optimal operation, the operating modes must have the same frequency (mode-matching). To achieve mode-matching quadrature cancellation must be performed. Differential operation (for improved sensitivity) can be achieved using the extra sense-electrodes. The unused electrodes are connected to a polarization voltage ($V_P$). The star-shell 12 is also maintained at $V_P$.

Figure 4A:
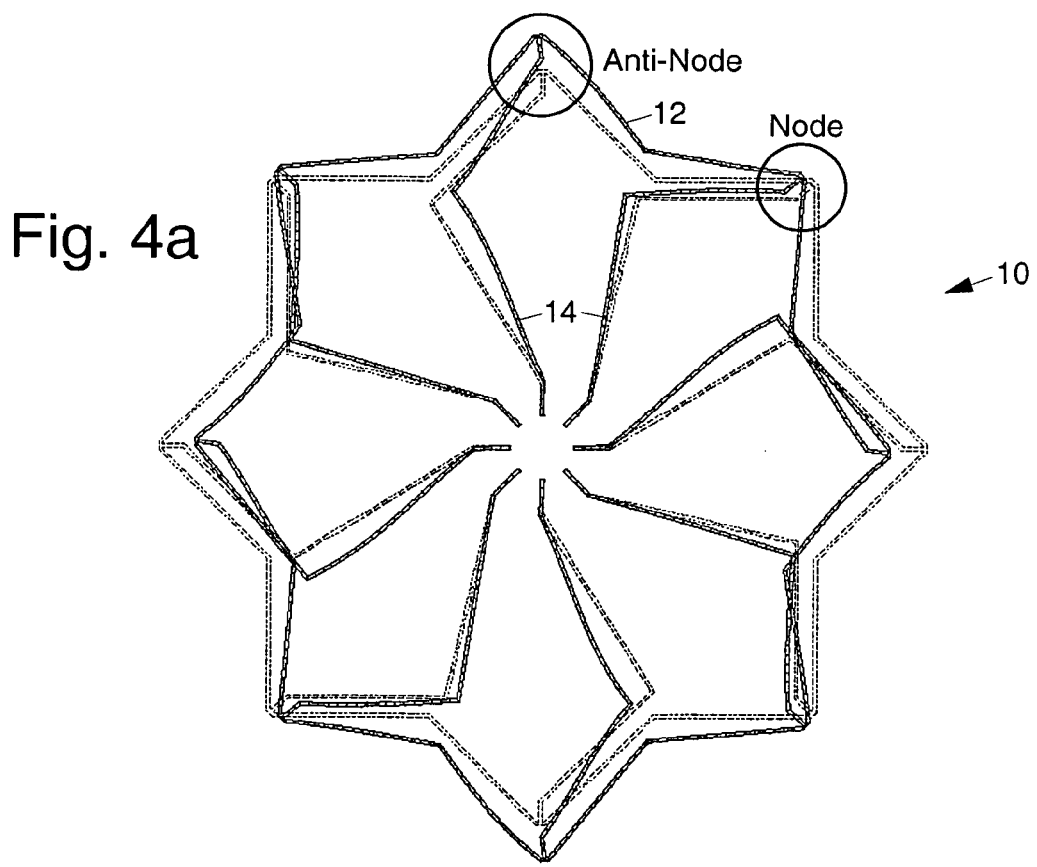
FIGS. 4a and 4b illustrate primary degenerate flexural modes of an exemplary resonating star gyroscope.
Figure 4B:
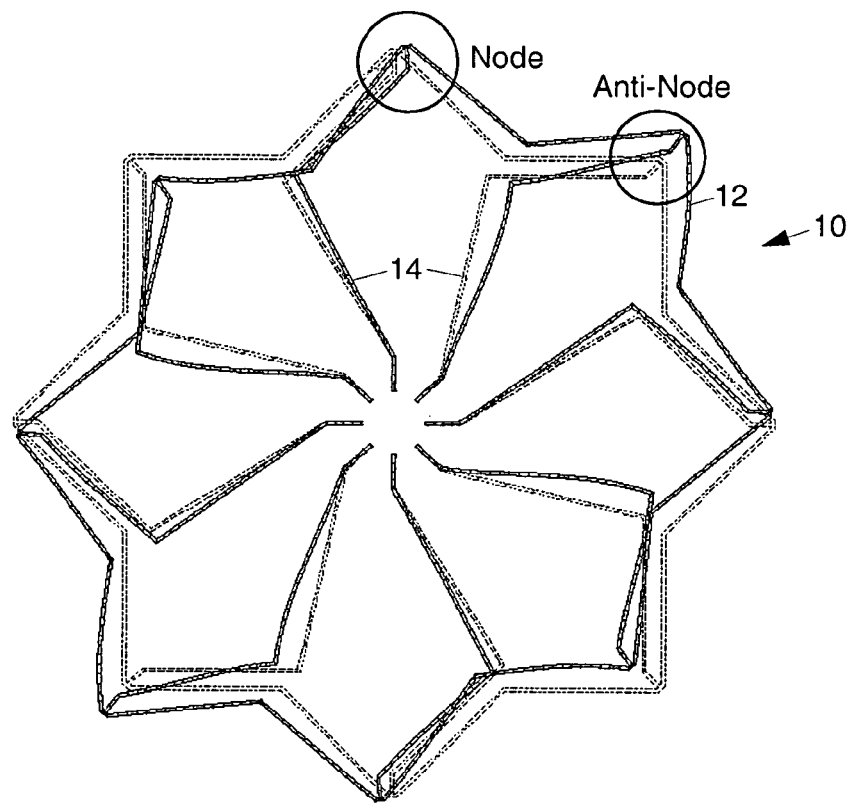
Figure 5A:
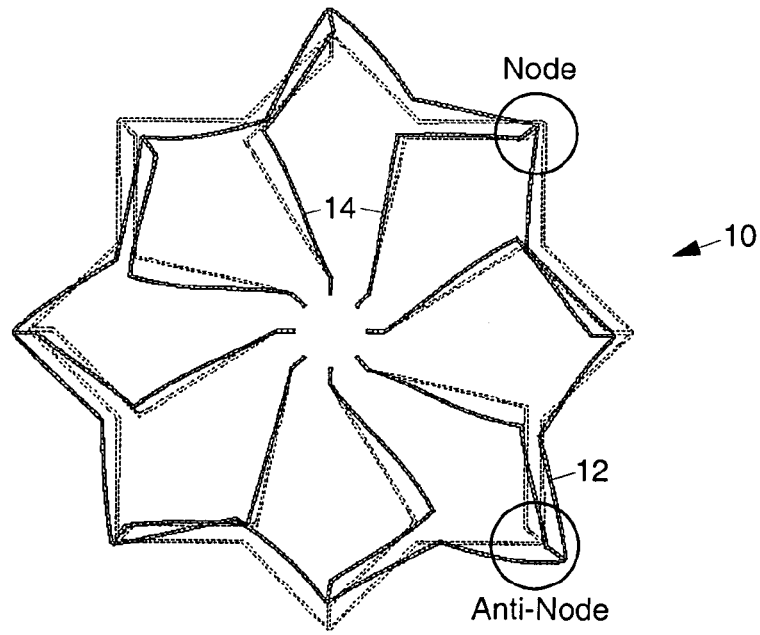
FIGS. 5a and 5b illustrate higher order flexural modes of an exemplary resonating star gyroscope.
Figure 5B:
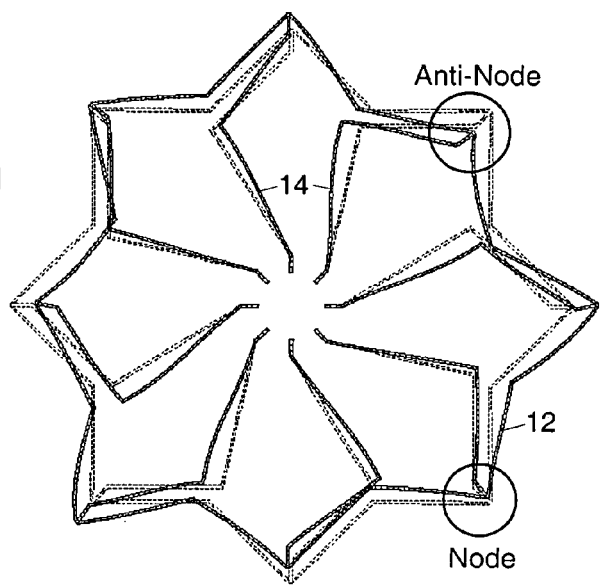

FIGS. 4a and 4b illustrate primary degenerate flexural modes of an exemplary resonating star gyroscope 10. As is shown in FIGS. 4a and 4b, the mode shapes are spatially 45° apart. This is the preferred mode of operation. FIGS. 5a and 5b illustrate higher order flexural modes of an exemplary resonating star gyroscope 10. As is shown in FIGS. 5a and 5b, the mode shapes are spatially 30° apart. This is a secondary mode of operation.

Figure 6:
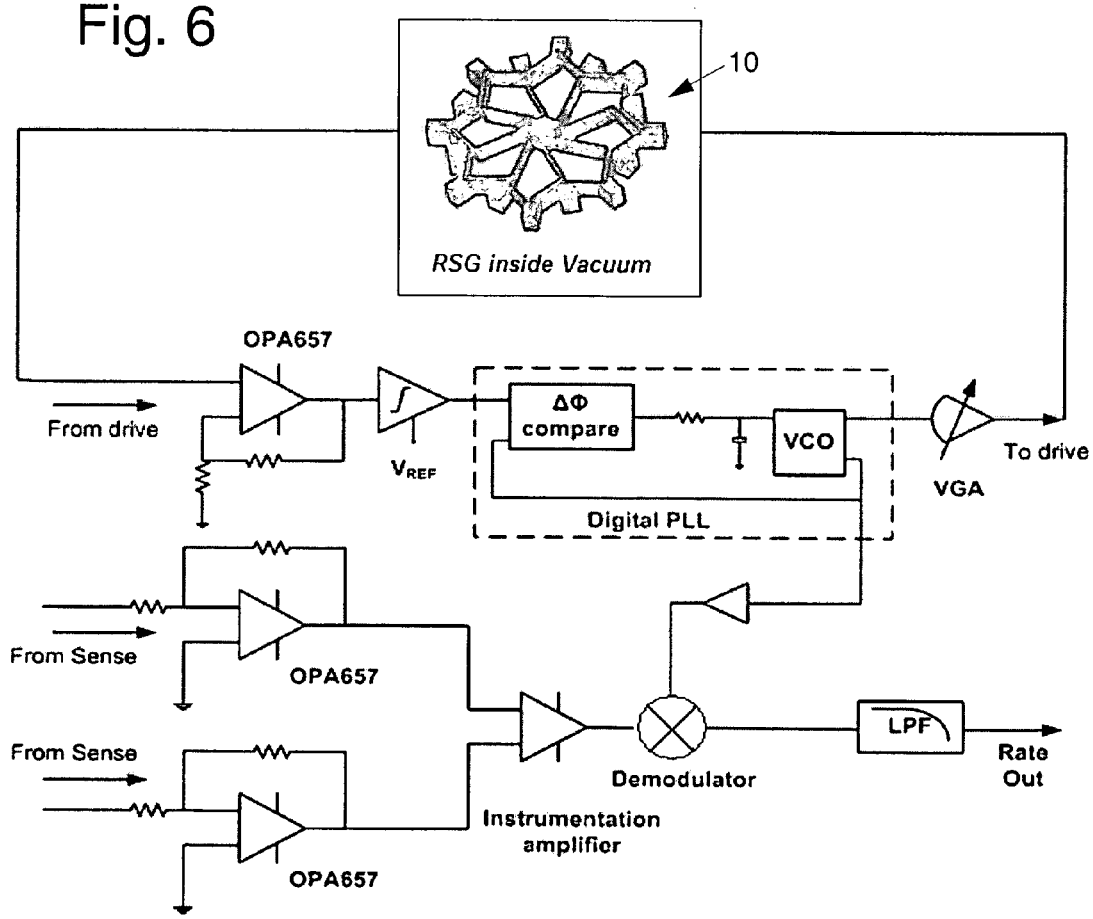
FIG. 6 is a schematic illustrating basic characterization electronics for use with the resonating star gyroscope.

FIG. 6 is an schematic illustrating characterization electronics for use with the resonating star gyroscope 10. More sophisticated electronics are required to ensure automatic mode-matching, quadrature cancellation, and operation in the closed-loop (to ensure flexible operating bandwidth).

Figure 7:
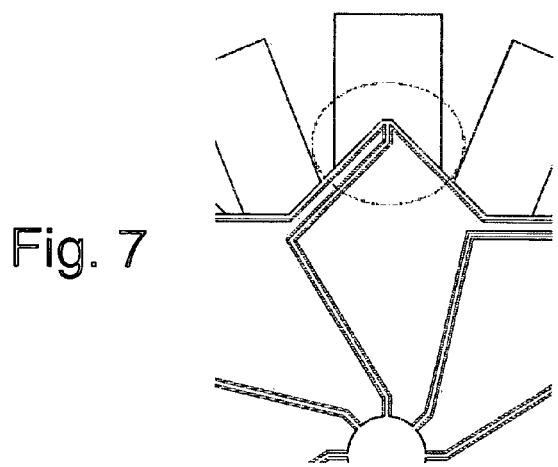
FIG. 7 illustrates the increased electrode area of an exemplary resonating star gyroscope.
Figure 7A:
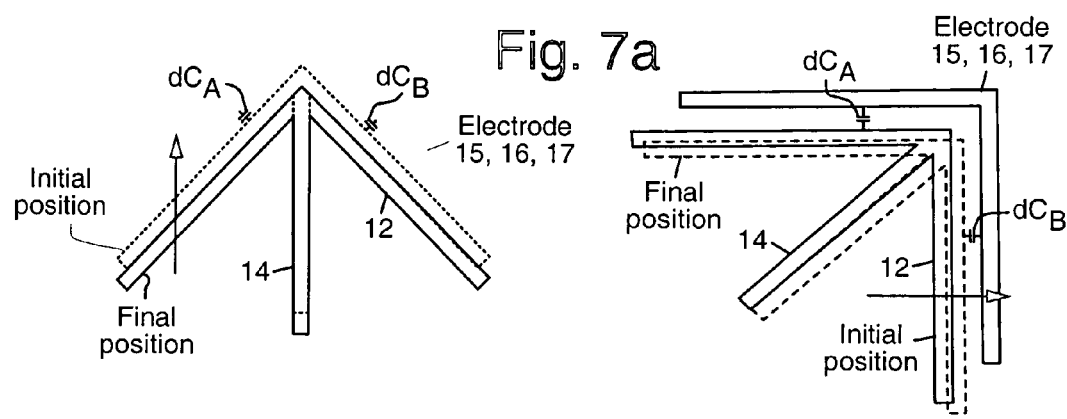
FIG. 7a shows the encircled portion of FIG. 7 and illustrates inherent quadrature cancellation provided by the resonating star gyroscope.

FIG. 7 illustrates the increased electrode area of an exemplary resonating star gyroscope 10. FIG. 7a shows the encircled portion of FIG. 7 and illustrates that quadrature cancellation is provided by the resonating star gyroscope 10.

Figure 8:
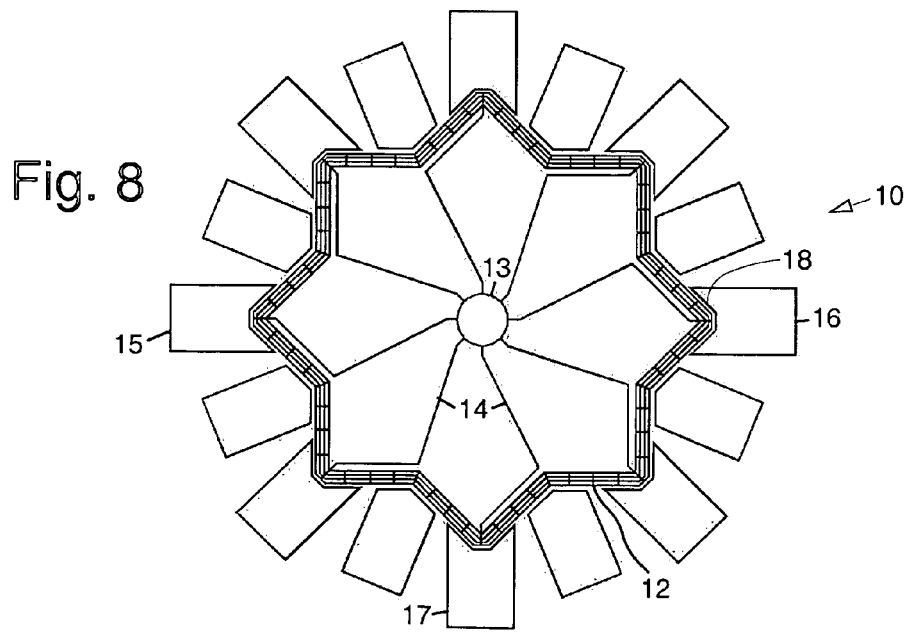
FIG. 8 illustrates an exemplary multi-shell implementation of a resonating star gyroscope.
Figure 8A:
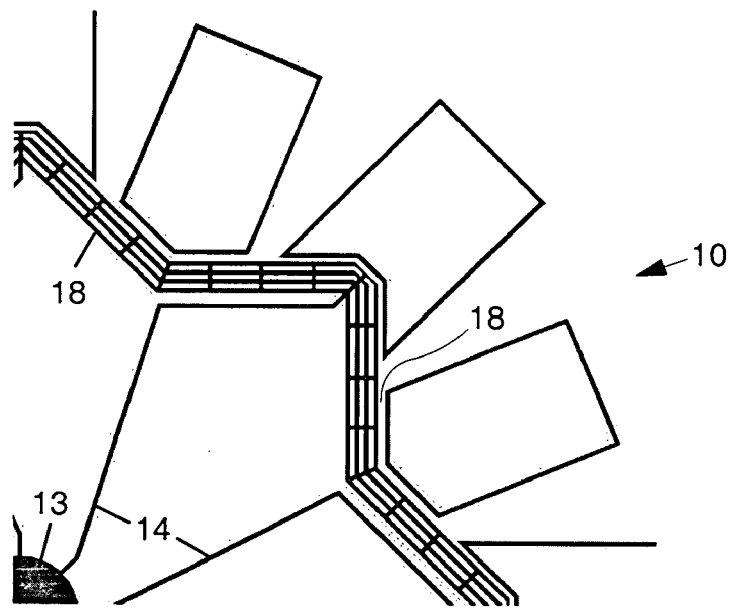
FIG. 8a shows an enlarged view of a section of FIG. 8.

In order to increase the effective resonant mass (and consequently decrease the mechanical noise of the gyro 10) multiple-shells 12 may be implemented. FIG. 8 illustrates an exemplary multi-shell implementation of a resonating star gyroscope 10, FIG. 8a shows an enlarged view of the portion of FIG. 8.

HARPSS Implementation

Figure 9:
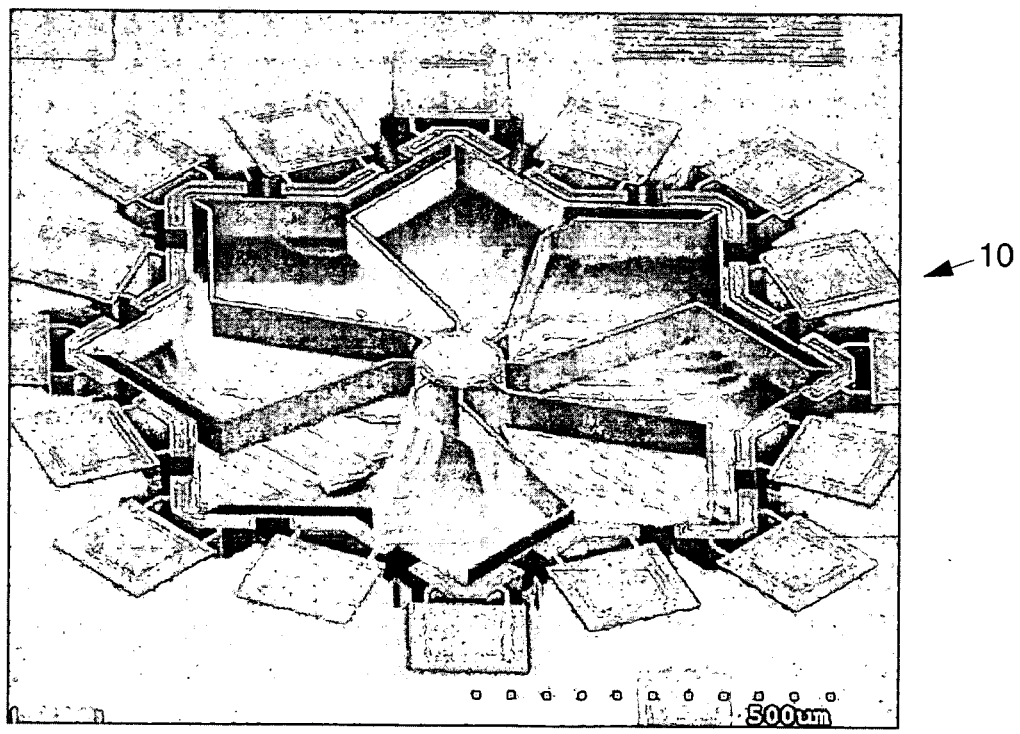
FIG. 9 illustrates a HARPSS implementation of the exemplary resonating star gyroscope.

FIG. 9 illustrates an exemplary resonating star gyroscope 10 fabricated using a High Aspect Ratio and Poly- and Single-crystalline Silicon (HARPSS) process. In the resonating star gyroscope 10 shown in FIG. 9, the substrate 20 is a low resistivity silicon wafer. The structural material is doped trench-refilled polysilicon. The anchor 13 is defined by an etched silicon post. Electrodes 15, 16, 17 are isolated using a nitride passivation layer.

Referring to FIGS. 10a-10f, they illustrate exemplary steps of a HARPSS fabrication process 30 that may be used to fabricate the resonating star gyroscope 10 shown in FIG. 9. The HARPSS fabrication process 30 may be used to fabricate thick polysilicon versions of the resonating star gyroscope 10. Representative processing steps are also disclosed in a paper by F. Ayazi and K. Najafi, entitled "A High-Aspect Ratio Combined Poly and Single-Crystal Silicon (HARPSS) MEMS Technology", IEEE/ASME JMEMS, September 2000, pp. 288-294.

Figure 10A:
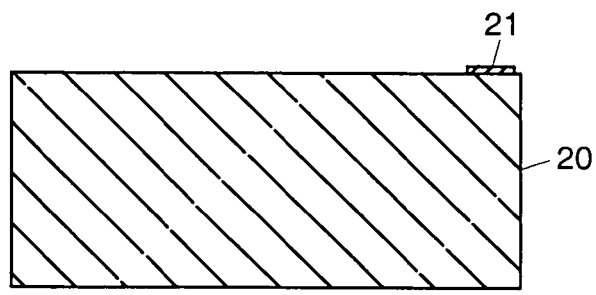
FIGS. 10a-10f illustrate exemplary steps of a HARPSS fabrication process used to fabricate the resonating star gyroscope.
Figure 10B:
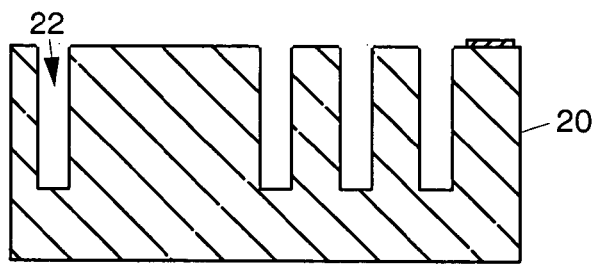
Figure 10C:
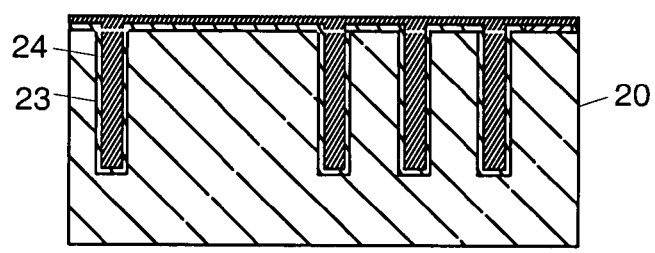
Figure 10D:
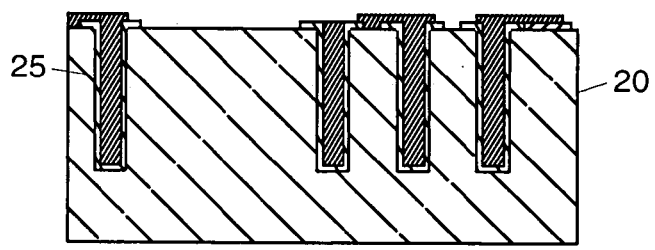
Figure 10E:
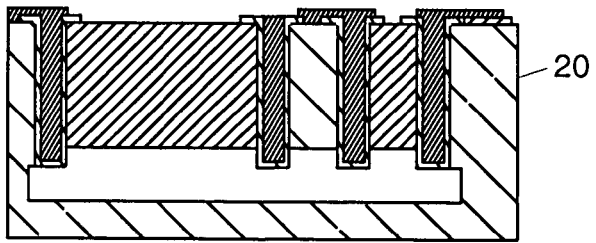
Figure 10F:
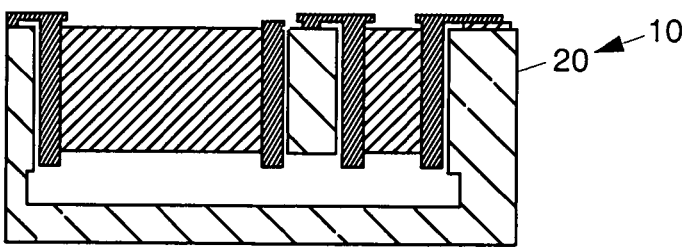

As is shown in FIG. 10a, a nitride isolation layer 21 is formed on a substrate 20. This layer acts as electrical isolation between the substrate and the device electrode. (A host of other material may be used as a dielectric isolation material). As is shown in FIG. 10b, trenches 22 are etched to define the geometry of the resonating star gyroscope 10. As is shown in FIG. 10c, sacrificial oxide 23 is deposited (using a low pressure chemical vapor deposition (LPCVD) system) and doped. The sacrificial oxide layer may also be formed by thermal oxidation of the exposed silicon. The trenches 22 are refilled with LPCVD polysilicon 24. As is shown in FIG. 10d the polysilicon layer 24 is etched back, the oxide 23 is patterned, and the polysilicon 24 is deposited, doped and patterned. As is shown in FIG. 10e, an anisotropic silicon etch is performed and the vibratory structure of the resonating star gyroscope 10 is undercut using an isotropic silicon etch. As is shown in FIG. 10f, the sacrificial oxide 23 is then etched 46 in hydrogen fluoride (HF) solution, for example, to release the resonating structure from the substrate 20 and form the gyroscope 10.

As is illustrated by FIGS. 10a-10f, mechanical structures (resonating star gyroscopes 10) are created by refilling trenches 21 with polysilicon 22 deposited over a sacrificial oxide layer 23. The structural layer of polysilicon 22 is doped to make it conductive. Silicon sense electrodes 16 as tall as the star-shaped shell 12 (ring structure) are released from the substrate 20 using a two-step dry release process. Small high aspect ratio capacitive actuation gaps 24 (1 μm) between the electrodes 15, 16, 17 and the star-shaped shell 12 enable low voltage operation of the gyroscope 10.

Figure 11A:
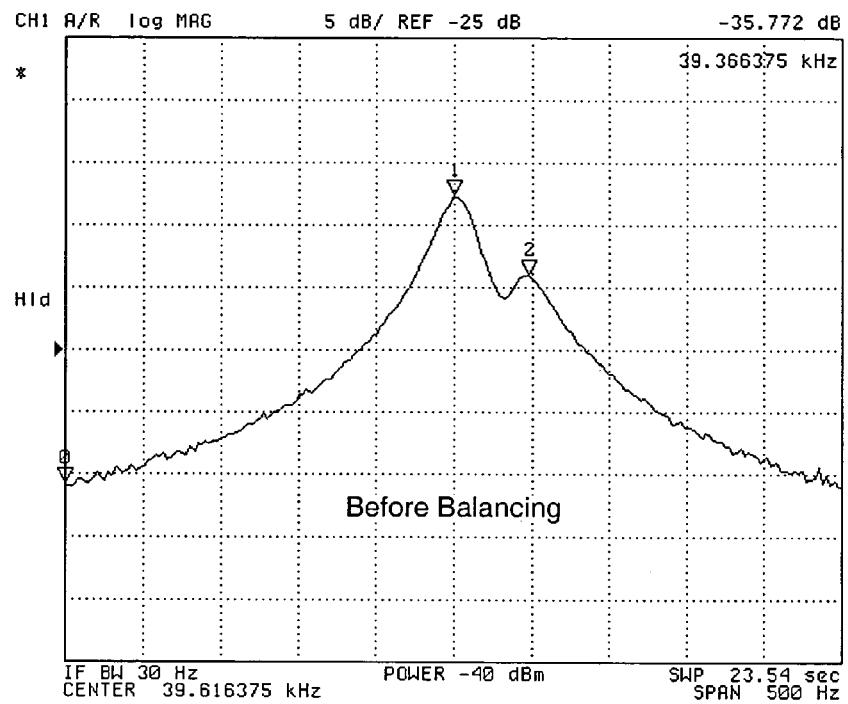
FIGS. 11a and 11b are graphs showing frequency response of the primary flexural modes of an exemplary HARPSS implementation of the resonating star gyroscope before and after mode matching respectively.
Figure 11B:
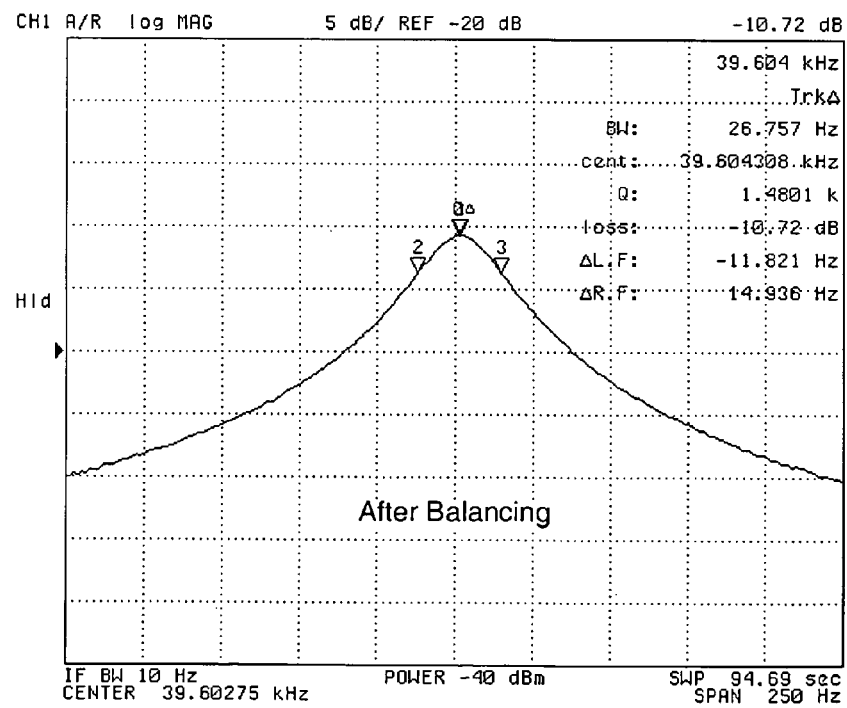
Figure 12:
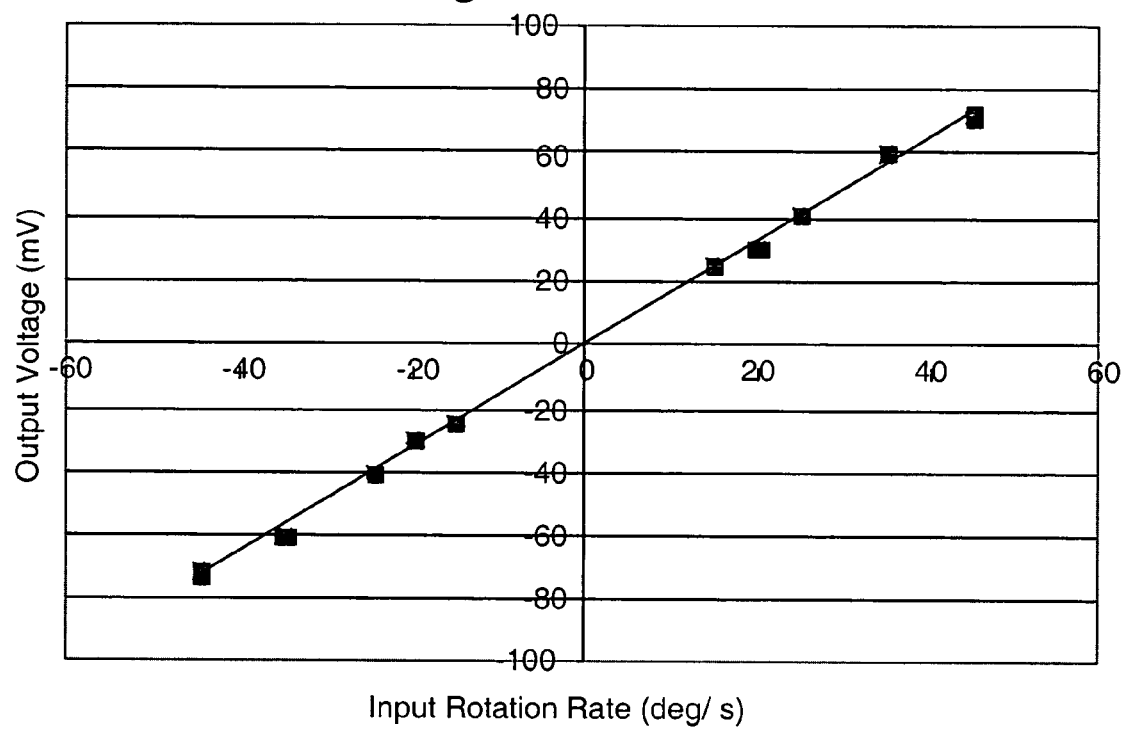
FIG. 12 is a graph that illustrates sensitivity of the HARPSS fabricated resonating star gyroscope.

FIGS. 11a and 11b are graphs showing frequency response and mode matching, respectively, for the primary flexural modes of an exemplary HARPSS implementation of the resonating star gyroscope 10. FIG. 12 is a graph that illustrates sensitivity of the HARPSS fabricated resonating star gyroscope 10.

Figure 13:
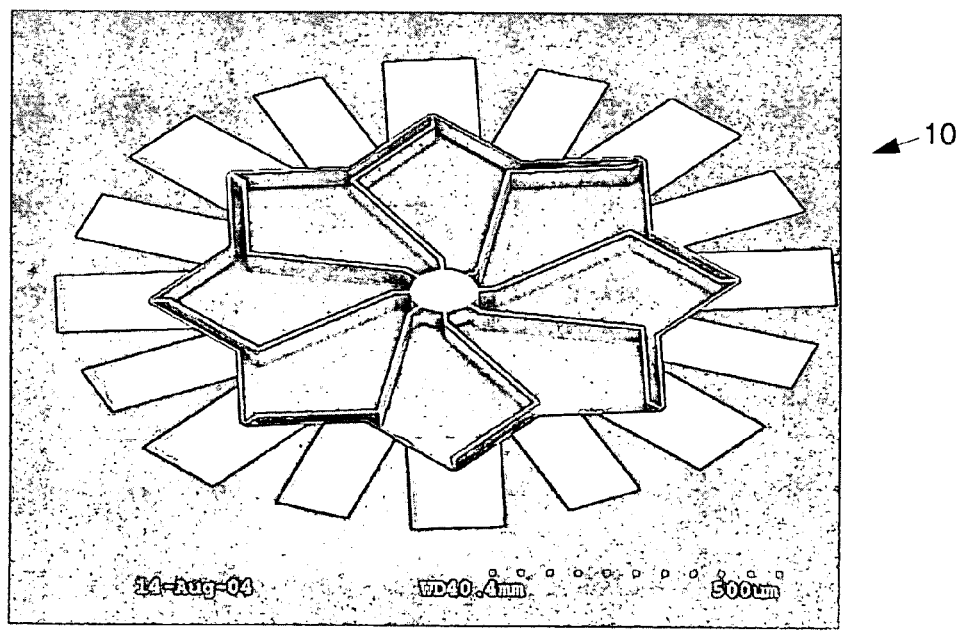
FIG. 13 illustrates exemplary (100) single crystal silicon on insulator implementation of the exemplary resonating star gyroscope.
Figure 14A:
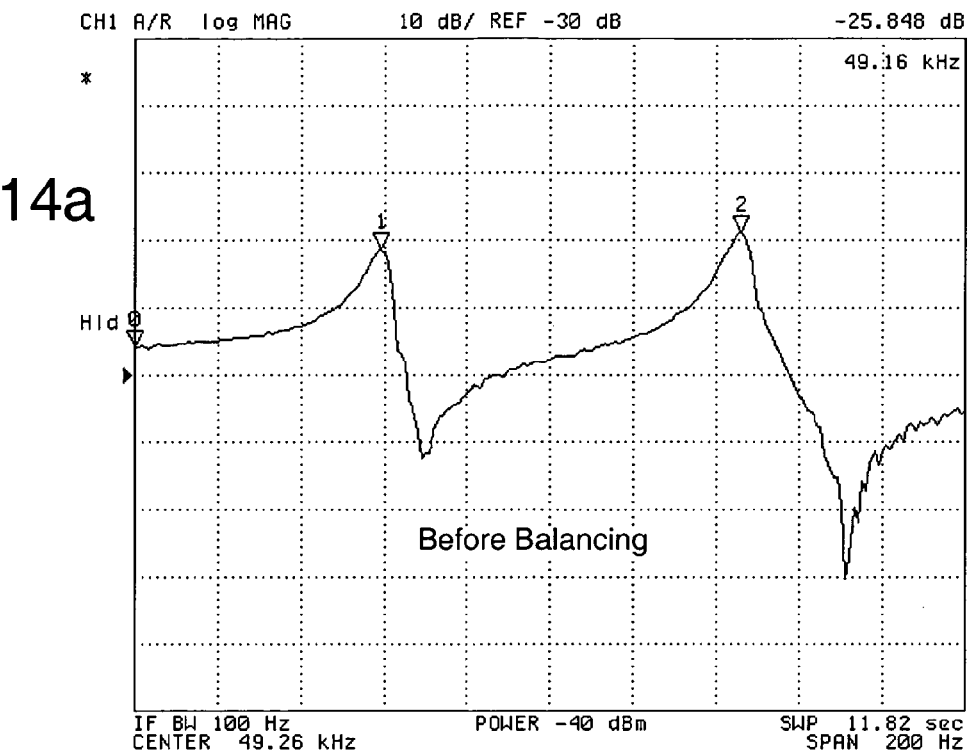
FIGS. 14a and 14b are graphs showing frequency response of the higher-order flexural modes of an exemplary (100) single crystalline silicon implementation of the resonating star gyroscope before and after mode matching respectively.
Figure 14B:
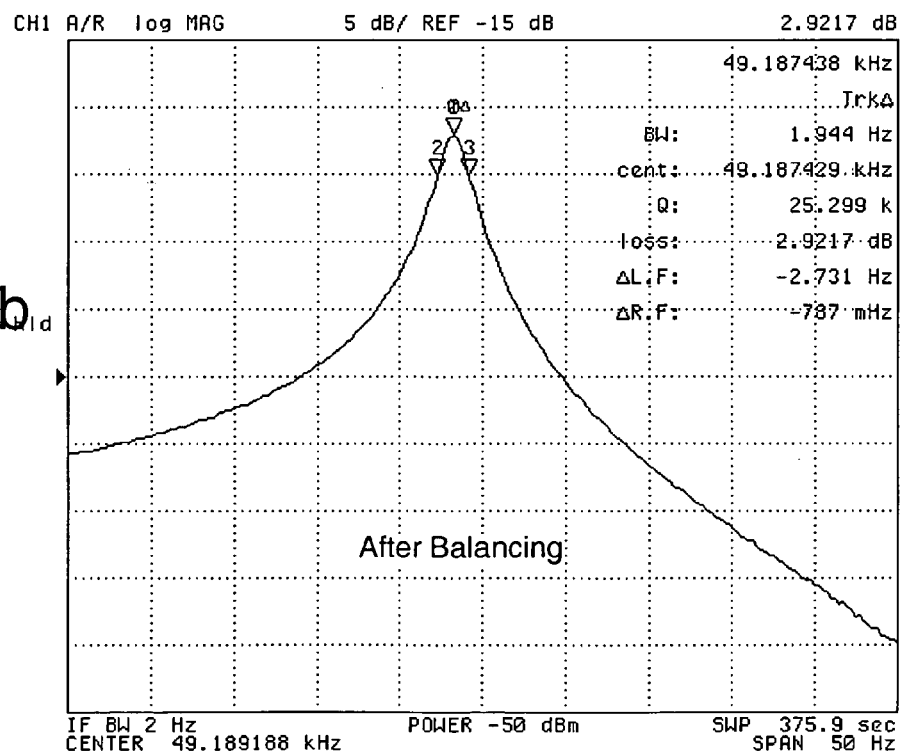
Figure 14C:
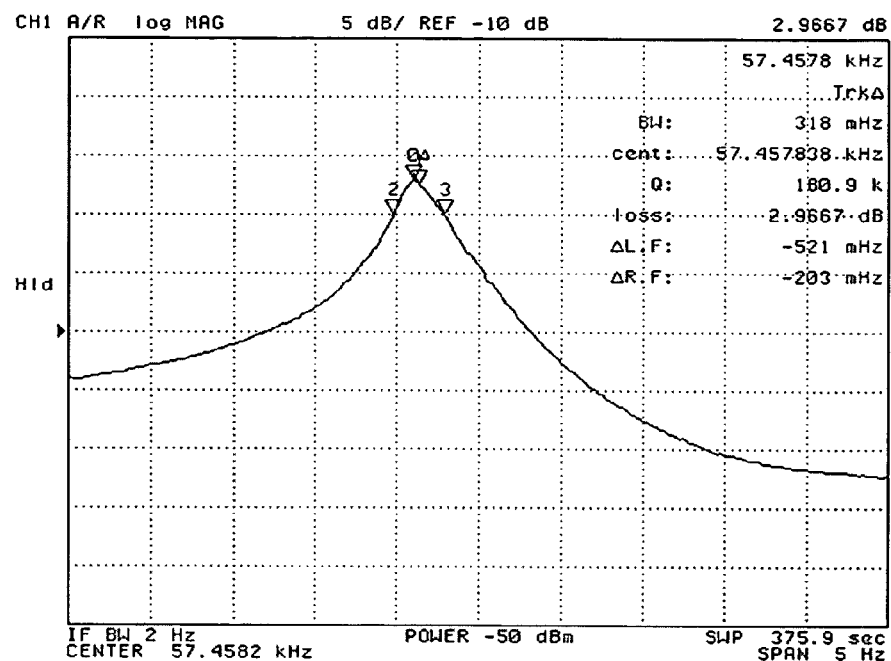
FIG. 14c is a graph that illustrates the frequency response of a high-Q, higher-order flexural resonant mode of the (100) single crystal silicon on insulator implementation of the resonating star gyroscope.

FIG. 13 illustrates an exemplary (100) single crystal silicon on insulator implementation of the resonating star gyroscope 10. The gyroscope 10 may be fabricated using deep reactive ion silicon etching. FIGS. 14a and 14b are graphs showing frequency response and mode matching, respectively, for the higher-order flexural modes of the single crystal silicon on insulator implementation of the resonating star gyroscope 10. FIG. 14c is a graph that illustrates high-Q, higher-order flexural modes of the (100) single crystal silicon on insulator implementation of the resonating star gyroscope shown in FIG. 13.

Figure 15:
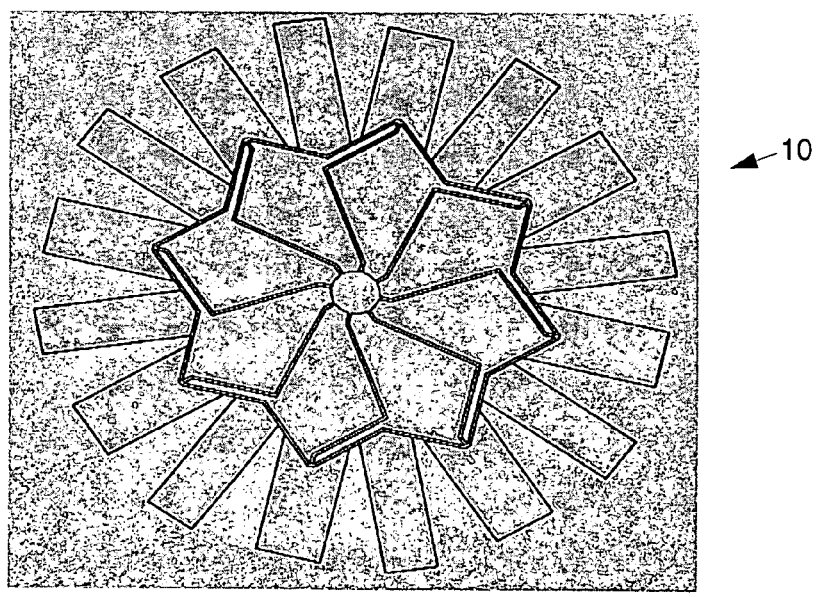
FIG. 15 illustrates an exemplary epitaxial-polysilicon implementation of the exemplary resonating star gyroscope.
Figure 16A:
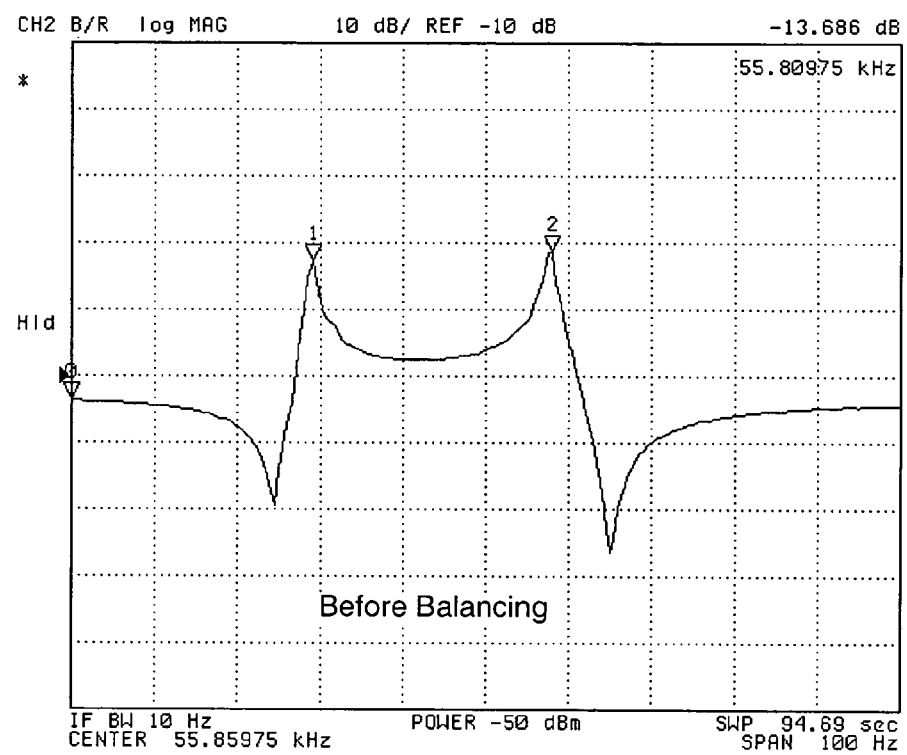
FIGS. 16a and 16b are graphs showing frequency response of the higher-order flexural modes of an exemplary epitaxial polysilicon implementation of the resonating star gyroscope before and after mode matching respectively.
Figure 16B:
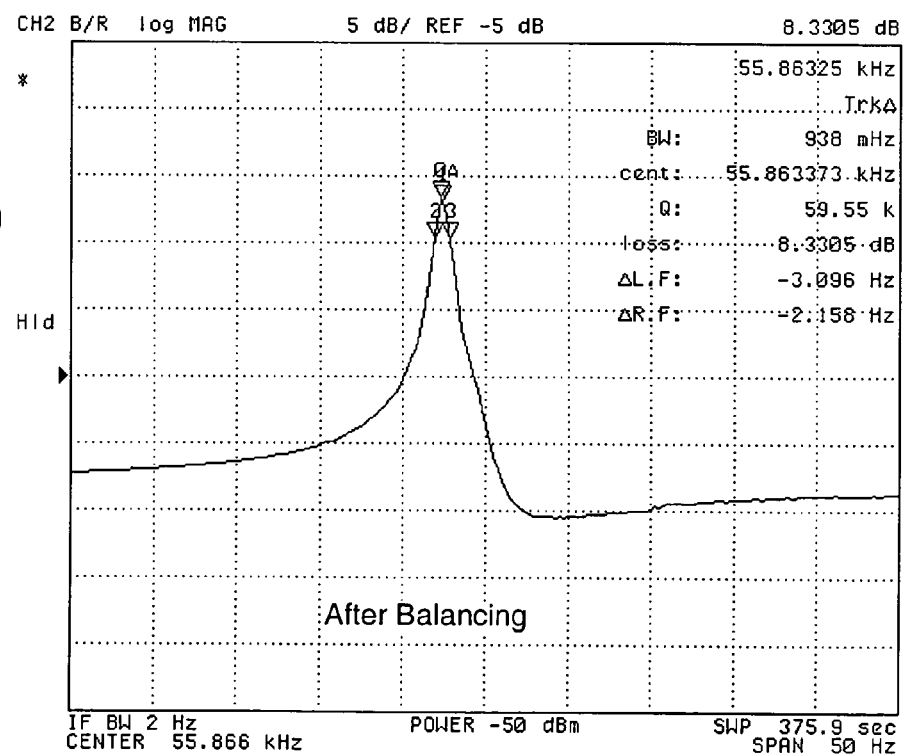
Figure 16C:
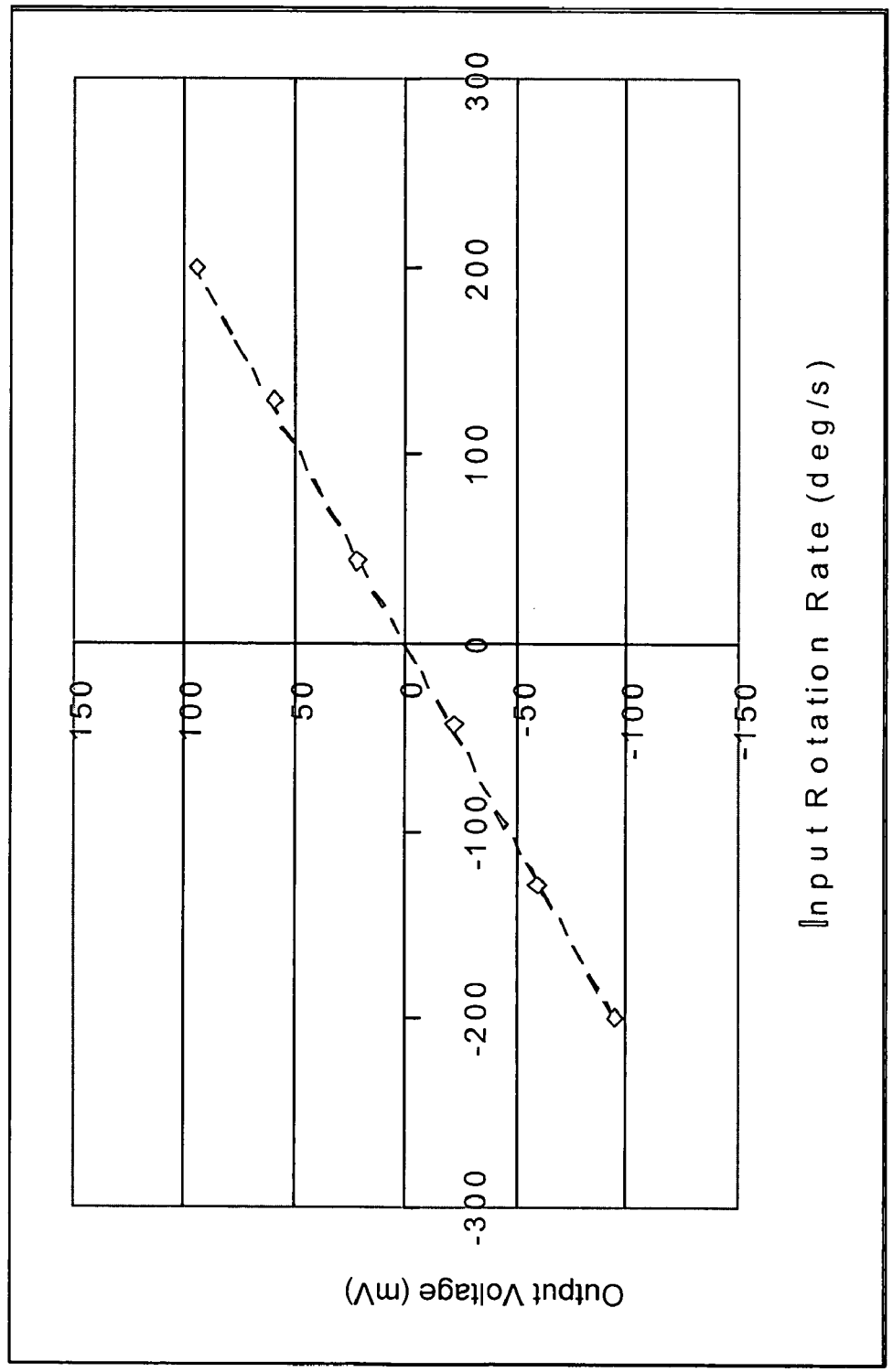
FIG. 16c is a graph that illustrates sensitivity of the epitaxial polysilicon implementation of the resonating star gyroscope.

FIG. 15 illustrates an exemplary epitaxial-polysilicon implementation of the exemplary resonating star gyroscope 10. The gyroscope may be fabricated using deep reactive ion silicon etching. FIGS. 16a and 16b are graphs showing frequency response and mode matching, respectively, for the higher-order flexural modes of an exemplary epitaxial-polysilicon implementation of the resonating star gyroscope 10. FIG. 16c is a graph that illustrates high-Q, higher-order flexural modes of the epitaxial-polysilicon implementation of the resonating star gyroscope 10.

Primary Degenerate Mode Operation

A prototype polysilicon resonating star gyroscope 10 was fabricated and tested open loop under vacuum. A sinusoidal drive signal was applied at the drive electrode and output signals, monitored at the 0° and 45° electrodes, were amplified using external amplifiers. The primary flexural mode frequency of the prototype gyroscopes 10 was measured to be 39.6 kHz which is in agreement with ANSYS simulations. Electronic tuning allows compensation of any fabrication imperfections that may cause a frequency separation (~100-400 Hz) between the two degenerate resonant modes. Frequency splits as great as 430 Hz have been matched by applying less than 11V tuning voltages to the tuning (balancing) electrodes 17. FIGS. 11a and 11b illustrates the two modes before and after balancing, respectively. After balancing, the two peaks merge together and the sense and drive mode frequencies become equal.

Table 1 illustrates an exemplary specifications for 1 mm polysilicon resonating star gyroscopes 10. Rate test from the polysilicon resonating star gyroscopes 10 under matched operation yields an open-loop sensitivity of 1.6 mV/°/s using discrete PCB electronics ($C_{parasitics}$~5 pF), as shown in FIG. 6. The measured Q of 1 mm, 65 μm-thick polysilicon resonating star gyroscopes 10 was 1500 under matched mode operation. This low Q-factor is attributed to anchor and bulk TED losses (voids inside polysilicon 22) such as is described in a paper by R. Abdolvand, G. K. Ho, A. Erbil, and F. Ayazi, entitled "Thermoelastic Damping in Trench-Refilled Polysilicon Resonators," Proc. Transducers 2003, pp. 324-327, and can be improved by optimizing the design.

TABLE 1

| Device Parameter | Value |
| --- | --- |
| Primary flexural mode frequency | 39.6 kHz |
| Polarization voltage | 4.8 V |
| Quality factor | 1500 |
| Mechanical resolution | 0.03°/s/√Hz |
| Rate sensitivity | 1.6 mV/°/s |

An epitaxial polysilicon implementation of the resonating star gyroscope 10 also yields primary flexural mode operation. FIGS. 16a and 16b illustrates the two modes before and after balancing, respectively. After balancing, the two peaks merge together and the sense and drive mode frequencies become equal. Rate tests from the epitaxial polysilicon implementation of the resonating star gyroscopes 10 under matched operation yields an open-loop sensitivity of 0.5 mV/°/s using discrete PCB electronics, as shown in FIG. 16c.

The above two implementations are examples of resonating star gyroscope structures fabricated using an isotropic elastic material. Anisotropic (111) silicon may also be utilized to implement resonating star gyroscope 10 (in the primary flexural mode operation).

Higher-Order Degenerate Mode Operation

A single crystalline silicon (SCS) implementation of the resonating star gyroscope 10 provides for significantly improve quality factor which has been verified by an SOI prototype. The pair of higher-order degenerate modes, shown in FIGS. 5a and 5b, may also be used to detect rotation. In this degenerate pair the nodes and antinodes are located 30° apart.

In order to increase sensitivity and achieve better rate resolutions, it is desirable for the degenerate flexural modes to have high quality factors, greater drive amplitudes and larger mass. In an effort to achieve this, a single crystal silicon (SCS) implementation of the resonating star gyroscope 10 was fabricated. A high Q of 47,000 was measured for the primary flexural mode. However, due to the anisotropic nature of (100) SCS substrate 20, the primary drive and sense flexural modes occur 3.6 kHz apart (as predicted by ANSYS simulations and verified experimentally). An interesting solution is to operate the gyroscope 10 using its higher-order degenerate flexural modes. As predicted by ANSYS simulations, these higher-order degenerate modes occur within close proximity of one another (<1 kHz) and may be tuned electronically.

(100) Single Crystalline Silicon Implementation

Single crystal silicon resonating star gyroscopes 10 were fabricated on 40 μm thick low resistivity SOI. Actuation gaps between the electrodes 15, 16, 17 and the vibrating shell 12 is defined through DRIE trench etching step and is therefore aspect ratio limited.

The higher-order flexural mode frequency of the prototype gyroscope 10 was observed at 49.2 kHz as predicted by ANSYS simulations. The frequency split between the two secondary flexural modes is compensated using a similar scheme described to tune the primary order flexural modes of the polysilicon resonating star gyroscope 10. FIGS. 14a and 14b show the two resonant modes before and after balancing, respectively.

Wider capacitive gaps 24 (3 μm) reduce device capacitance and consequently increases required operating voltages. Polarization and balance voltages (to compensate 330 Hz frequency split) for the SCS resonating star gyroscope 10 are 20V and 26V respectively. Table II summarizes key parameters of the SCS implementation of the resonating star gyroscope 10 and illustrates exemplary specifications for 1 mm single crystal silicon resonating star gyroscopes 10. Subsequent testing of other SCS resonating star gyroscopes 10 have yielded quality factors in excess of 100,000 for these higher-order degenerate modes (see FIGS. 9a and 9b).

TABLE II

| Device Parameter | Value |
| --- | --- |
| Flexural mode frequency | 49.2 kHz |
| Polarization voltage | 20 V |
| Quality factor | 25000 |

Thus, improved resonating star gyroscopes 10 have been disclosed. Two modes of operation are possible using two distinct fabrication processes. The polysilicon HARPSS implementation of the resonating star gyroscope 10 was used to demonstrate primary degenerate mode operation. The HARPSS fabrication process facilitated high-aspect ratio sense and actuation gaps 24. This increased the sensitivity and enabled operation at low voltages. The polysilicon resonating star gyroscope 10 demonstrated a sensitivity of 1.6 mV/°/s and has a Brownian noise floor of $0.03°/s/\sqrt{Hz}$. The SCS SOI implementation of the resonating star gyroscope 10 exhibited higher-order degenerate mode operation. High-Q and higher frequency resonant modes were achieved in this implementation which improves the Brownian noise floor.

Thus, resonating star gyroscopes and fabrication methods relating thereto have been disclosed. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. Apparatus, comprising:
a substrate; and
resonator apparatus comprising:
a support member connected to the substrate;
multiple flexural springs coupled to the support member and separated from the substrate that extend outwardly from the support member;
a star-shaped resonator coupled to ends of the flexural springs distal from the support member and separated from the substrate; and
drive and sense electrodes surrounding the star-shaped resonator.

2. The apparatus recited in claim 1 wherein the star-shaped resonator comprises LPCVD or epitaxial polycrystalline silicon.

3. The apparatus recited in claim 1 wherein the star-shaped resonator comprises single crystal silicon having (100) or (111) orientations.

4. The apparatus recited in claim 1 wherein the star-shaped resonator is selected from a group consisting of silicon carbide, quartz, and diamond.

5. The apparatus recited in claim 1 further comprising one or more tuning electrodes surrounding the star-shaped resonator.

6. The apparatus recited in claim 1 wherein the drive and sense electrodes are separated from the star-shaped resonator by gaps.

7. The apparatus recited in claim 5 wherein the one or more tuning electrodes are separated from the star-shaped resonator by gaps.

8. The apparatus recited in claim 1 wherein selected electrodes contact the star-shaped resonator.

9. The apparatus recited in claim 1 wherein the support member and multiple flexural springs are disposed interior to the star-shaped resonator.

10. The apparatus recited in claim 1 wherein the support member and multiple flexural springs are disposed exterior to the star-shaped resonator.

11. The apparatus recited in claim 1 wherein selected electrodes are disposed interior to the star-shaped resonator.

12. The apparatus recited in claim 1 wherein selected electrodes are disposed exterior to the star-shaped resonator.

13. The apparatus recited in claim 1 wherein the star-shaped resonator is comprised of multiple star-shaped shells that are interconnected.

14. he apparatus recited in claim 1 wherein the star-shaped resonator comprises an eight or twelve-faceted star.

15. Apparatus, comprising:
a substrate; and
resonator apparatus comprising:
a support member connected to the substrate;
a multi-faceted star-shaped resonator coupled to the support member and separated from the substrate; and
drive and sense electrodes surrounding the star-shaped resonator.

16. The apparatus recited in claim 15 wherein the star-shaped resonator comprises single crystal silicon having (100) or (111) orientations.

17. The apparatus recited in claim 15 wherein the star-shaped resonator comprises LPCVD or epitaxial polycrystalline silicon.

18. The apparatus recited in claim 15 wherein the star-shaped resonator has perforations in its structure.

19. The apparatus recited in claim 15 wherein the star-shaped resonator is connected to the support member at its center of mass.

20. The apparatus recited in claim 15 wherein the star-shaped resonator is connected to the support member at one or more locations around an inner surface of a periphery of the star-shaped resonator.

21. The apparatus recited in claim 15 wherein the star-shaped resonator comprises an eight or twelve-faceted star.

22. The apparatus recited in claim 15 wherein the star-shaped resonator is perforated or has holes for structural release from the substrate.

* * * * *

UNITED STATES PATENT AND TRADEMARK OFFICE
CERTIFICATE OF CORRECTION

| | | |
|---|---|---|
| PATENT NO. | : 7,360,423 B2 | Page 1 of 1 |
| APPLICATION NO. | : 11/341721 | |
| DATED | : April 22, 2008 | |
| INVENTOR(S) | : Farrokh Ayazi et al. | |

It is certified that error appears in the above-identified patent and that said Letters Patent is hereby corrected as shown below:

Column 1, line 8, please insert the following paragraph after the paragraph entitled

"CROSS-REFERENCE TO RELATED APPLICATIONS."

FEDERALLY SPONSORED RESEARCH

This invention was made with government support under Contract Number EEC-9402723 awarded by the National Science Foundation. The government has certain rights in this invention.

Signed and Sealed this

Sixteenth Day of March, 2010

David J. Kappos
*Director of the United States Patent and Trademark Office*